United States Patent [19]
Shah

[11] Patent Number: 5,317,694
[45] Date of Patent: May 31, 1994

[54] FAST WRITE SUPPORT FOR VGA CONTROLLER

[75] Inventor: Viren Shah, Fremont, Calif.

[73] Assignee: Chips and Technologies, Inc., San Jose, Calif.

[21] Appl. No.: 852,436

[22] Filed: Mar. 16, 1992

[51] Int. Cl.5 .............................. G06F 13/00
[52] U.S. Cl. ............................ 395/275; 395/800; 395/550; 364/238.2
[58] Field of Search ............... 395/275, 800, 550; 364/238.2

[56] References Cited

U.S. PATENT DOCUMENTS

| | | | |
|---|---|---|---|
| 4,885,703 | 12/1989 | Deering | 364/522 |
| 4,972,368 | 11/1990 | O'Brien et al. | 364/900 |
| 4,992,956 | 2/1991 | Kaku et al. | 364/519 |
| 5,150,456 | 9/1992 | Wu et al. | 395/114 |
| 5,179,713 | 1/1993 | Catlin et al. | 395/800 |

Primary Examiner—Dale M. Shaw
Assistant Examiner—D. Smith
Attorney, Agent, or Firm—Townsend and Townsend Khourie and Crew

[57] ABSTRACT

VGA controller interface circuitry that allows the VGA controller to reduce the cycle time of a write to the controller below the default write cycle time, resulting in a significant improvement of the controller's performance. The controller interface circuitry uses a Zero Wait State control signal on the system bus to reduce the cycle time by overriding the default cycle time for a memory write, unless the /Ready signal is asserted by the controller.

1 Claim, 1 Drawing Sheet

FAST WRITE SUPPORT FOR VGA CONTROLLER

BACKGROUND OF THE INVENTION

The present invention relates generally to the field of computer graphics, most particularly to the field of Video Graphics Array (VGA) type computer graphics.

VGA graphics controllers are commonly employed to provide color graphics capabilities for personal computers with architectures based on the 80×86 family of microprocessors. One of the more common of these architectures is that of the "AT" type personal computer. VGA graphics controller cards are generally memory mapped devices, for which graphic display is controlled by AT system bus memory writes to the VGA controller card. The speed with which the VGA controller card can process a memory write and become available for another memory write is a determinative factor in its performance capabilities.

When the system bus writes to a memory mapped device, it waits for a predetermined cycle time, a multiple of the period of the bus clock, to allow the device to receive and process the data, before performing any more writes. Many VGA graphics controllers are of a class of devices that exchange data with the system bus in eight bit groups; for such eight bit devices the default AT write cycle time is six bus clock periods, which for a standard 8 Mhz clock comes to 750 ns. Other VGA controllers are 16 bit devices, for which the default write cycle is 3 clock periods. Even though VGA controllers may not always be able to process a memory write within this default cycle time, the default may still be used because of the existence of an override signal on the AT bus. If the controller needs more than the default number of periods, it asserts a /Ready (not-ready) override signal on the AT bus, by drawing it low. The microprocessor will then extend the write cycle until /Ready is released. Some VGA controllers have been further equipped with a selectable write buffer, to minimize the likelihood that /Ready will be needed, but further increases in speed are desired.

SUMMARY OF THE INVENTION

The present invention provides VGA controller interface circuitry that allows the VGA controller to reduce the cycle time of a write to the controller, resulting in a significant improvement of the controller's performance. VGA controller interface circuitry according to the invention takes advantage of the fact that a VGA controller employing a write buffer frequently is able to complete a write cycle in less than the default cycle time. The controller interface circuitry uses a Zero Wait State control signal on the system bus to reduce the cycle time by overriding the default cycle time for a memory write, unless the /Ready signal is asserted by the controller. /Ready is thus used to extend the interface circuitry default cycle time rather than to extend the computer processor default write cycle time. For 8 bit devices, the cycle time is thus reduced to either three or four clock periods (depending on the computer system), and for 16 bit devices the cycle time is reduced to two clock periods.

A further understanding of the nature and advantages of the invention may be realized by reference to the remaining portions of the specification and the drawings.

DESCRIPTION OF THE PREFERRED EMBODIMENT

Figure 1:
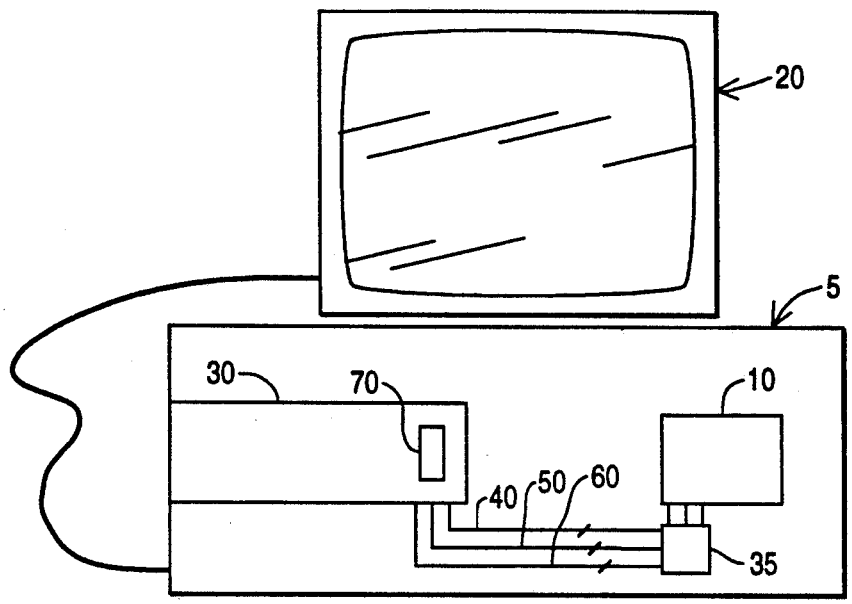
FIG. 1 is a diagram illustrating a computer system employing a VGA controller.

FIG. 1 illustrates a diagram of a basic computer system employing a Video Grid Array (VGA) controller. Computer system 5 includes computer processor 10 that controls display 20 through VGA controller 30. Computer processor 10 is coupled to VGA controller 30 by system control circuitry 35 and an AT system bus comprising data bus lines 40, address lines 50, and control lines 60. In the diagram, VGA controller 30 is shown to possess a write buffer 70.

According to the present invention, for interacting with computer processor 10, VGA controller 20 possesses in addition to standard VGA interface circuitry which will not be described here, zero wait state circuitry for allowing write cycles of less that the system default write cycle time.

Figure 2:
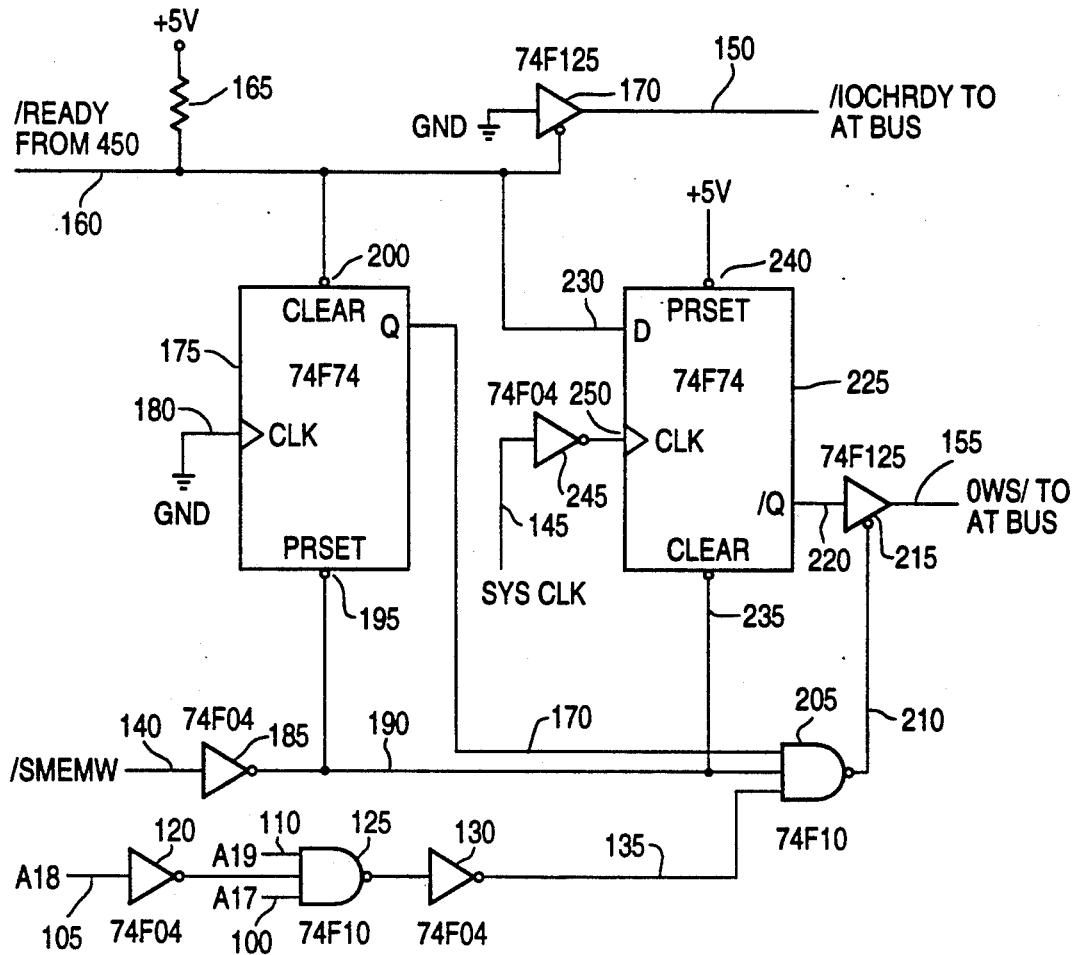
FIG. 2 is a circuit diagram of VGA controller interface circuitry according to one embodiment of the present invention.

One particular embodiment of such zero wait state circuitry is illustrated in FIG. 2. This circuitry takes as input several signals from the system bus. Address lines A17, A18, and A19, indicated by reference numerals 100, 105 and 110, respectively, are decoded by invertor 120, NAND gate 125 and invertor 130 to create a VGA address decoder signal 135 (VGA controllers are generally mapped at memory location A0000). Also received from the system bus are two control signals, system memory write signal 140 and system clock 145. Two other system control bus signals may be driven by the circuit: IO Channel Ready signal 150 and Zero Wait State signal 155.

From the VGA controller itself the circuitry receives a controller not-ready signal 160, which is normally not asserted, in a high state and tied through pullup resistor 165 to Vcc (5V). Incidentally to the main function of the fast write circuitry, controller not-ready signal 160 gates a buffer 170 whose input is tied to ground and whose output is IO Channel Ready signal 150. Thus, if controller not-ready signal 160 is asserted, IO Channel Ready 150 will be pulled low.

A fast write signal 170 is produced as the Q output of a D type flip-flop 175. The clock input 180 of flip-flop 175 is grounded, and the flip-flop is controlled entirely by its clear and preset inputs. System memory write signal 140, which is in a low state when asserted, passes through invertor 185 to produce an inverted system memory write signal 190, which is tied to preset input 195 of flip-flop 175. Clear input 200 of flip-flop 175 is tied to controller not-ready signal 160. Preset input 195 and clear input 200 are triggered by low inputs. Because controller not-ready signal 160 is normally high and inverted system memory write signal 190 is normally low, output 170 of flip-flop 175 is normally in a high state. At the beginning of a memory write, a data value is placed on data bus lines 40, an address is placed on address bus lines 50, and system memory write signal 140 is pulled low. Signal 190 will then be high, no longer maintaining flip-flop output 170 in a high state. Fast write signal 170 will remain in a high state unless controller not-ready signal 160 is pulled low during the memory write, at which point fast write signal 170 is drawn low as well. At the end of a write cycle controller not-ready signal 160 and system memory write signal 140 both return high, causing fast write signal 170 to again assume a high state. Fast write signal 170 thus indicates whether controller not-ready signal 160 has yet been asserted during a current system memory write.

The concurrence of fast write signal 170, inverted system memory write signal 190, and VGA address decoder signal 135 is determined by three input NAND gate 205. Output 210 of NAND gate 205 serves as a zero wait state driver select signal and is coupled to an inverted gate of a buffer 215. Buffer 215 acts as a zero wait state driver, and drives zero wait state signal 155 of the system control bus. The input to buffer 215 is a /Q output 220 of a D type flip-flop 225. Flip-flop 225 has data input 230 supplied by controller not-ready signal 160, a clear input 235 supplied by inverted system memory write signal 190, and a preset input 240 tied high. System clock 145 passes through an invertor 245 and is supplied to clock input 250 of flip-flop 225.

Because inverted system memory write signal 190, coupled to clear input 235, is normally low, /Q output 220 of flip-flop 225 is normally high. When system memory write signal 140 is asserted, at the next falling edge of system clock 145 output 220 will be pulled low unless controller not-ready signal 160 departs from its normally high state.

Thus, when a memory write is performed to the VGA controller, at the next falling edge of the system clock the zero wait state control signal will be asserted unless the controller not-ready signal has been asserted for that memory write. The assertion of the zero wait state signal during the first or second clock cycle of the memory write will cause the system to use a fast memory write cycle of only three or four clock cycles rather than the default of six clock cycles for 8 bit devices, and for 16 bit devices will result in a fast memory write cycle of only 2 clock cycles instead of the default three clock cycles. VGA controllers with enabled write buffers will normally be able to perform the write within this time, and will therefore not assert the controller not-ready signal. If more time is needed, the controller will determine this and assert the controller not ready signal to prevent the assertion of the zero wait state signal. This method and additional circuitry therefore allows the VGA controller to operate much more efficiently.

Experimental Results

Below are related experimental results detailing the improvement in performance provided by the present invention. All of the tests were performed with an 82C450 8 bit VGA controller both unaugmented and augmented with performance enhancement circuitry according to the present invention, operating in an 80286 computer system having 512 Kbytes (4 DRAMS) of video memory. Mode 12 indicates a monitor mode of 640×480 pixels with 16 Colors. Mode 72 indicates a monitor mode of 1024×768 pixels with 16 Colors. Mode 79 indicates a monitor mode of 640×480 pixels with 256 Colors. Test A is an old benchmark used by PC magazine; the units are seconds and a lower number indicates higher performance. Test B is a Windows benchmark currently employed by PC magazine. These results are aggregate scores of 125 tests run under Windows 3; a lower number indicates higher performance. Test C is a MEMSPEED benchmark developed by Chips and Technologies, and indicates a rate of performing machine level memory writes; the units are Mbytes/second and a higher number indicates higher performance.

|  | No Perf. Enhancement | With Perf. Enhancement | % Gain |
|---|---|---|---|
| Test A |  |  |  |
| a) TTY | 0.44 | 0.44 | 0 |
| b) TTY W/Scroll | 1.82 | 1.59 | 14 |
| c) Rep STOSW | 3.02 | 2.03 | 49 |
| Test B |  |  |  |
| Mode 12 | 1830 | 1662 | 10.1 |
| Mode 72 | 2799 | 2633 | 6.3 |
| Mode 79 | 3323 | 3212 | 3.5 |
| Test C |  |  |  |
| Mode 12 |  |  |  |
| STOSW | 1.34 | 2.1 | 57 |
| MOVSB (Video to Video) | 0.62 | 0.76 | 22.5 |
| MOVSB (System to Video) | 1.19 | 1.81 | 52 |
| Mode 72 |  |  |  |
| STOSW | 1.32 | 1.55 | 17.5 |
| MOVSB (Video to Video) | 0.61 | 0.73 | 20 |
| MOVSB (System to Video) | 1.19 | 1.46 | 23 |
| Mode 79 |  |  |  |
| STOSW | 1.12 | 1.32 | 18 |
| MOVSB (Video to Video) | 0.57 | 0.66 | 16 |
| MOVSB (System to Video) | 1.08 | 1.23 | 14 |

It is to be understood that the above description is intended to be illustrative and not restrictive. Many embodiments will be apparent to those of skill in the art upon reviewing the above description. For instance, whereas the particular embodiment described is implemented by discrete logic components, the teachings of the present invention could readily be applied to on-chip implementations. The scope of the invention should, therefore, be determined with reference to the appended claims, along with the full scope of equivalents to which such claims are entitled.

What is claimed is:

1. A video graphics array (VGA) controller, for coupling to a system bus of a computer processor, said system bus having a zero wait state signal, wherein said system bus further includes a system clock signal and a system memory write signal, said VGA controller comprising:
   a) a controller not-ready signal; and
   b) means for asserting said zero wait state signal when a system memory write has been performed to said VGA controller and said controller not-ready signal is not asserted, whereby a cycle time for memory writes by said computer processor to said VGA controller is reduced, said means for asserting said zero wait state signal comprising
      i) means for asserting a fast-write signal if said controller not-ready signal has not been in an asserted state after a most recent state transition of said system memory write signal from not asserted to asserted, comprising a D type flip-flop having
         1) a grounded clock input;
         2) a flip-flop clear signal coupled to said controller not-ready signal;

3) a flip-flop preset signal coupled to said system memory write signal;
4) said fast-write signal as an output;

ii) means for generating a zero wait state driver select signal in response to a concurrence of said fast-write signal, said system memory write signal, and a VGA controller address decoder signal, comprising a nand gate having as inputs said fast-write signal, said system memory write signal, and said VGA controller address decoder signal, said nand gate generating said zero wait state driver select signal as an output; and iii) means for asserting a zero wait state driver input signal at a falling edge of said system clock signal, comprising a D type flip-flop having
1) a flip-flop clear signal coupled to said system memory write signal;
2) a clock input coupled through an inverter to said system clock signal, and
3) a data input coupled to said controller not-ready signal; and iv) a zero wait state driver having as an input said zero wait state driver input signal, controlled by said zero wait state driver select signal, for driving said zero wait state signal.

* * * * *